United States Patent Office 3,796,695
Patented Mar. 12, 1974

3,796,695
COORDINATION BONDING IN
ETHYLENE POLYMERS
Bert H. Clampitt, Overland Park, Ronald E. Gilbert, Shawnee Mission, and Joseph W. Jones, Jr., Leawood, Kans., assignors to Gulf Research & Development Company, Pittsburgh, Pa.
No Drawing. Filed Jan. 14, 1971, Ser. No. 106,557
Int. Cl. C08f 15/40
U.S. Cl. 260—80.73
5 Claims

ABSTRACT OF THE DISCLOSURE

Coordination bonding in ethylene polymers is obtained by contacting a water-insoluble, self-emulsifiable ethylene-acrylamide polymer containing pendant acid and/or ammonium salt groups dispersed in an aqueous medium with a carbonate or bicarbonate salt of a polyvalent metal at elevated temperatures.

BACKGROUND OF INVENTION

The preparation of ethylene polymers containing pendant salt groups by the neutralization of ethylene-ethylenically unsaturated acid copolymers is disclosed in U.S. Pat. 3,264,272. U.S. Pat. 3,485,785 discloses the preparation of ethylene polymers containing pendant carboxylate groups by the hydrolysis of an ethylene-alkyl acrylate copolymer and also discloses the preparation of such ethylene polymers containing pendant amide groups.

The polymers produced by the processes described in the above-named patents have solid state properties characteristic of crosslinked polymers and melt-fabricability properties characteristic of uncross-linked thermoplastic polymers. These polymers have found wide application in the packaging field. Such polymers have been employed in combination with polyethylene, for example, to prepare laminated film articles of manufacture.

A disadvantage of the polymers produced by the neutralization of the ethylene-ethylenically unsaturated acid copolymers and the hydrolysis of the ethylene-alkyl acrylate copolymers is the water-pickup of the polymers which may be attributed to the presence of the pendant salt groups in the polymer. As the result of this water-pickup, such polymers have restricted application in particular packaging areas.

Accordingly, an object of the invention is to provide a novel ethylene polymer containing pendant metallic carboxylate salt and amide groups.

Another object of the invention is to provide a novel process for the production of ethylene polymers containing pendant polyvalent metallic salt and amide groups.

Yet another object of the invention is to provide a process for the preparation of a shelf-stable aqueous dispersion of an ethylene polymer containing pendant polyvalent metallic salt and amide groups.

A further object of the invention is to provide an ethylene polymer containing pendant polyvalent metallic salt and amide groups, said ethylene polymer having a reduced water-pickup.

Other objects, advantages and features of the invention will be readily apparent to those skilled in the art from the following description and appended claims.

SUMMARY OF INVENTION

A shelf-stable aqueous dispersion of an ethylene polymer containing pendant polyvalent metallic salt groups, and wherein coordination bonding is obtained through pendant acrylamide groups, is prepared by contacting a water-insoluble, self - emulsifiable ethylene - acrylamide polymer containing pendant acid and/or ammonium salt groups dispersed in an aqueous medium with a carbonate or bicarbonate salt of a polyvalent metal at elevated temperatures.

DESCRIPTION OF INVENTION

The preparation of aqueous dispersions of water-insoluble, self-emulsifiable ethylene polymers containing pendant amide, acid and/or ammonium salt groups is disclosed in U.S. Pat. 3,511,799. The subject patent describes the preparation of stable aqueous dispersions of such ethylene polymers by contacting an aqueous dispersion of a water-insoluble, self-emulsifiable ethylene polymer containing metallic carboxylate salt and amide groups with an ion exchange medium comprising a strongly acidic cation exchange resin charged with ammonium ions. The ammonium ions are exchanged for the metallic cations of the ethylene polymer and an aqueous dispersion substantially free of metallic cations is recovered from the ion exchange zone. Upon heating, the ammonium salt group decomposes to form the carboxylic acid group.

As described in U.S. Pat. 3,511,799, the water-insoluble, self-emulsifiable ethylene polymers employed in the ion exchange process can be prepared by the process disclosed in U.S. Pat. 3,485,785, which describes the hydrolysis of an ethylene-alkyl acrylate copolymer containing from 0.01 to about 0.5 mol of acrylate groups per mol of contained ethylene groups. The disclosures of the above-named patents insofar as they relate to the preparation of ethylene polymers containing pendant amide, acid and/or ammonium salt groups and stable aqueous dispersions of such polymers are incorporated herein by reference thereto.

The novel compositions of the invention are prepared from ethylene polymers which in addition to polymerized ethylene monomer units contain pendant acid and/or ammonium salt groups, and which also contain pendant amide groups. The invention is applicable to those ethylene polymers wherein the concentration of pendant carboxyl and/or ammonium salt groups is in the range of 2 to 30 mol percent, preferably in the range of 4 to 12 mol percent of the ethylene polymer. The mol concentration of the pendant amide groups is in the range of 0.05 to 0.5 per mol of pendant carboxyl and/or ammonium salt groups. As employed in this invention, the pendant acid, ammonium salt and amide groups will comprise the following structures:

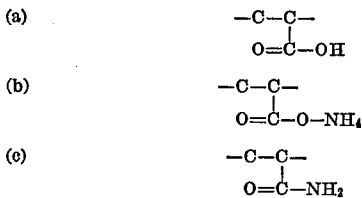

The invention is particularly applicable, although not to be limited thereto, to water-insoluble, self-emulsifiable ethylene polymers prepared by the process described in U.S. 3,511,799. In a preferred embodiment, shelf-stable aqueous dispersions of water-insoluble, self-emulsifiable ethylene polymers containing pendant amide, carboxyl and/or ammonium salt groups and prepared by the process described in the patent, are contacted with an inorganic carbonate or bicarbonate salt of a polyvalent metal at elevated temperatures. Preferably, stoichiometric concentrations of the metal salt are employed in the aqueous medium to effect conversion of carboxyl and/or ammonium salt groups to the polyvalent metal salt form. The use of stoichiometric concentrations of the metallic salt eliminates the problem of separating unreacted salt from the aqueous medium. It will be readily apparent to those skilled in the art that unless complete conversion of the carboxyl and/or ammonium salt groups to the polyvalent metal salt form is desired, less than stoichiometric concentrations of the metal salt will be employed. Although the invention is generally applicable to inorganic, polyvalent, metallic carbonate and bicarbonate salts, the divalent salts are preferred. Copper, zinc, manganese, chromium, iron, cobalt, nickel, europium, cerium, and lanthanum are illustrative of salts suitable in the practice of the invention.

The reaction is conducted in an aqueous medium and at an elevated temperature of at least 50° C. Desirably, in the practice of the invention, the maximum temperature to be employed is the water boiling temperature. Normally, the concentration of polymer solids in the aqueous medium will be less than 35 weight percent and the time for the reaction will range from 15 minutes to 1 hour with the degree of conversion desired establishing the time of reaction.

Carbon dioxide and ammonia are apparently liberated during the reaction, permitting the production of an aqueous dispersion of an ethylene polymer free of any contaminating by-products. The aqueous dispersion of the ethylene polymers so produced are viscosity stable and have been shown to have a shelf-stability in excess of one year when stored at ambient temperatures.

In addition to conversion of the pendant carboxylic acid and/or ammonium salt groups to the polyvalent metal salt form, coordination bonding to the metallic cation is obtained. When, for example, zinc carbonate is used in the inventive process, the ethylene product polymer of the invention has the following structure:

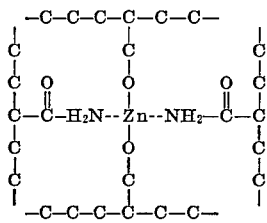

It will be understood by those skilled in the art that the structural formula appearing above is incomplete as zinc has a coordination number of four and, therefore, amide linkages would also be bonded to the zinc atom from above and below the illustrated plane. The presence of the amide groups in the ethylene polymer employed in the process of the invention results in a more ordered (or at least a more symmetrical) crosslinked polymer system than would be the result if the polymer employed in the process contained only pendant acid and/or ammonium salt groups. The coordination bonds of the ethylene polymer produce a tight crosslinked network which is not otherwise obtainable in the absence of the pendant amide groups.

Existence of coordination bonds is indicated by comparison of an infrared analysis of the starting ethylene polymer with the infrared analysis of the product ethylene polymer and examination of the $3.0\mu$, $6.0\mu$ and $6.8\mu$ bands. The $3.0\mu$ band is associated with N-H stretching frequency; the $6.0\mu$ band is a super position of two bands, one associated with the carboxyl group and the other associated with the $NH_2$ group; and the $6.8\mu$ band is associated with the C-H group and serves as an internal thickness standard. If there was no coordination bonding, the band ratios of $6.0\mu/6.8\mu$ and $3.0\mu/6.8\mu$ would be essentially the same for the ethylene polymer feed and the ethylene polymer product of the invention. A comparison of the infrared analyses of the starting ethylene polymer and the ethylene polymer product shows a substantial reduction in the above-named ratios, demonstrating coordination bonding in the ethylene polymer product.

The following examples are presented to illustrate objects and advantages of the invention. It is not intended, however, that the invention should be limited to the specific embodiments described therein.

EXAMPLE I

In this example an aqueous dispersion of a water-insoluble, self-emulsifiable ethylene polymer containing 7.5 weight percent ethylene polymer solids was prepared. This aqueous dispersion of the ethylene polymer was prepared by the hydrolysis of an ethylenemethyl acrylate copolymer containing 20 weight percent methyl acrylate to produce an ethylene polymer therein 50 percent of the pendant acrylate groups were converted to the sodium salt form, 15 percent of the pendant acrylate groups were converted to the acid form, and 35 percent of the pendant acrylate groups were converted to the amide form. The hydrolysis product was then contacted with an ion exchange resin charged with ammonium ions and the ammonium ions were exchanged for the sodium ions. The prepared ion-exchanged aqueous dispersion of the ethylene polymer was then contacted with 1.11 grams of zinc carbonate per 100 cc. of the aqueous dispersion at a temperature of 75° C. for a period of 1 hour. The polymer solids were then recovered from the aqueous dispersion and an infrared analysis showed the ratio of the $6.0\mu$ band to the $6.8\mu$ band to be 0.38 and the ratio of the bands produced at $3.0\mu$ and $6.8\mu$ to be 0.14. Infrared analysis of the ethylene polymer feed recovered from the ion exchange zone showed that the ratio of the $6.0\mu$ band to the $6.8\mu$ band to be 0.63 and the ratio of the $3.0\mu$ band to the $6.8\mu$ band to be 0.21.

A comparison of the analytical results produced by analysis of the feed and product ethylene polymers demonstrates coordination bonding in the ethylene polymer product as there is a substantial reduction in the ratio of the $3.0\mu$ and $6.0\mu$ bands to the $6.8\mu$ band effected through the inventive process.

EXAMPLE II

The run of Example I was repeated with the exception that 1.96 grams of copper basic carbonate (Malachite) per 100 cc. of the aqueous dispersion was substituted for the zinc carbonate employed in Example I. Infrared analysis of the polymer product recovered from the aqueous dispersion showed the ratio of the $6.0\mu$ band to the $6.8\mu$ band to be 0.4 and the ratio of the $3.0\mu$ band to the $6.8\mu$ band to be 0.13.

A comparison of the ratios of the infrared bands of the ethylene feed polymer and the ethylene product polymer again demonstrates coordination bonding in the ethylene polymer as there is a substantial reduction in the ratios of the $3.0\mu$ and $6.0\mu$ bands to the $6.8\mu$ band.

EXAMPLE III

This example demonstrates that the coordination products of this invention have a substantially reduced water-pickup. A one gram sample of the water-insoluble, self-emulsifiable ethylene polymer hydrolysis product of Example I, wherein 50 percent of the pendant acrylate groups had been converted to the sodium salt form, and one gram samples of the coordination polymer products of Example I and II were placed for 72 hours in a 90 percent relative humidity environment. The ethylene polymer containing pedant sodium salt groups increased in weight, demonstrating a water-pickup of 14.1 weight percent. The coordination polymer product of Example I showed an increase of only 0.26 by weight and the coordination polymer product of Example II showed an increase in weight of only 0.07 percent. Thus, a comparison of the results obtained demonstrates that the coordination polymer products have a substantially reduced water-pickup.

Although the invention has been described with reference to specific materials, embodiments and details, various modifications and changes, within the scope of the invention, will be apparent to those skilled in the art and are contemplated to be embraced in the invention.

What is claimed is:

1. A process which comprises contacting an aqueous dispersion of an ethylene polymer containing from 2 to 30 mol percent of pendant carboxyl or ammonium salt groups and from 0.005 to 0.5 mol of pendant amide groups per mol of pendant carboxyl and ammonium salt groups with an inorganic polyvalent metallic carbonate or bicarbonate salt at a temperature of at least 50° C. for a period of time sufficient to convert at least a portion of the pendant carboxyl or ammonium salt groups to the polyvalent metallic salt form.

2. The process of claim 1 wherein said aqueous dispersion of an ethylene polymer comprises an aqueous dispersion of a water-insoluble, self-emulsifiable ethylene polymer.

3. The process of claim 1 wherein the concentration of pendant carboxyl and ammonium salt groups is in the range of 4 to 12 mol percent.

4. The process of claim 1 wherein the contact time is in the range of 15 minutes to 1 hour.

5. The process of claim 1 wherein said inorganic polyvalent metallic carbonate or bicarbonate salt is selected from the group consisting of copper, zinc, manganese, iron, cobalt, nickel and chromium.

References Cited

UNITED STATES PATENTS

| | | | |
|---|---|---|---|
| 3,322,734 | 5/1967 | Rees | 260—79.3 |
| 3,337,517 | 8/1967 | Anspon | 260—86.7 |
| 3,338,739 | 8/1967 | Rees | 117—138.8 |
| 3,485,785 | 12/1969 | Anspon | 260—29.6 |
| 3,553,178 | 1/1971 | Clampitt | 260—80.72 |

JAMES A. SEIDLECK, Primary Examiner

C. A. HENDERSON, Jr., Assistant Examiner

U.S. Cl. X.R.

260—29.6 TA, 86.7 Dig. 31